United States Patent [19]

Crevier

[11] 4,054,397
[45] Oct. 18, 1977

[54] WORK TOOL STABILIZING DEVICE

[76] Inventor: Edward C. Crevier, 9 Stoneham Drive, Riverside, R.I. 02915

[21] Appl. No.: 760,233

[22] Filed: Jan. 17, 1977

[51] Int. Cl.² .................. B23B 51/00; B26D 1/12; B23B 31/02; B23B 29/00
[52] U.S. Cl. .................. 408/199; 82/36 R; 408/238; 407/107
[58] Field of Search ............ 408/199, 150, 151, 236, 408/237, 238; 29/96; 82/36 R

[56] References Cited

U.S. PATENT DOCUMENTS

| | | | |
|---|---|---|---|
| 735,138 | 8/1903 | Normand | 82/36 R |
| 1,272,188 | 7/1918 | Bawden | 82/36 R |
| 2,399,271 | 4/1946 | Vonada | 82/36 R |
| 3,174,404 | 3/1965 | Findley | 82/36 R X |

*Primary Examiner*—Harrison L. Hinson
*Attorney, Agent, or Firm*—Salter & Michaelson

[57] ABSTRACT

A combination work tool and holder therefor, wherein the work tool is stabilized during work movement by the provision of an independently movable stabilizer bar mounted alongside and generally parallel to a tool holding bar, a rigid member clamping the bars together in order to increase the rigidity of the tool holding bar. The ability of the stabilizer bar to be independently moved enables the two bars to be clamped together in various positions in order to eliminate interference with working clearances and the like. Additionally a holding block construction for positioning the bars with respect to each other is disclosed.

9 Claims, 7 Drawing Figures

WORK TOOL STABILIZING DEVICE

BACKGROUND OF THE INVENTION

A recurring problem in the metal working field is obtaining adequate rigidity of working tools so that they do not upon performance of cutting operations yield or otherwise deflect to an extent which produces work of unacceptable tolerances. This is a particular problem in boring procedures, particularly when forming large diameter holes of substantial depth. Accordingly, as the diameter and depth of the hole to be bored increases, so generally does the diameter and length of the bar which supports the cutting tool in order that the tool be sufficiently rigid so that the resultant hole will be within acceptable tolerances. Thus the selection of a sufficiently large, i.e. rigid, boring bar for a particular purpose not only requires experience of the tool operator, but furthermore necessitates maintenance of a large inventory of boring bars, and even the requirement for different sized machine tools in order to accommodate such boring bars. This is not economical or feasible with many small or specialty oriented machine shops, and accordingly, it would be desirable to have available a tool system which provides for the satisfactory boring of holes of various depths and diameters without the necessity of maintaining a large inventory of tool holding bars.

Attempts to provide such capabilities have been made in the past and one such system is described in U.S. Pat. No. 2,399,271 issued Apr. 30, 1946. Therein a boring bar system comprising two parallel tool supporting rods is disclosed wherein each of the rods or bars is provided with a passage or slot at one end to cooperatively receive and support a tool. The support of the tool at spaced locations additionally serves to stabilize the tool during cutting operations. While functional, this system restricts the independent positioning of the supporting rods with respect to each other as well as relying upon the tool itself to provide the stabilizing effect between the two supporting rods.

Accordingly, it is an object of the present invention to provide a tool holding system in which a tool supporting bar is mounted with respect to a second independently movable stabilizer bar in such a manner that the initial tool holding bar is capable of either independent operation with or without the stabilizing bar.

Another object of the invention is the provision of a tool bar and stabilizer bar, whereby such bars are interconnected by means of a rigid member in such a manner as to stabilize movements of the tool during the cutting action thereof on the work piece.

A further object of the present invention is the provision of a tool stabilizing system of the type aforementioned in which the rigid member which serves to interconnect the tool supporting bar with the stabilizing bar is adapted for varying longitudinal disposition with respect to such bars.

A still further object of the present invention is to provide a novel holding device for a work tool stabilizing system including a first tool supporting bar interconnected to a generally parallely disposed stabilizer bar by means of a rigid interconnecting member, wherein the ends of said bars remote from the tool are positioned within spaced openings provided therein so as to affect such spaced bar disposition in varying attitudes dependent upon the configuration of such holding member or block.

A still further object of the invention is to provide means for laterally adjusting the position of a tool in position with respect to a tool holding bar by the use of a rigid member which interconnects such tool holding bar and a parallel disposed stabilizer bar at eccentric end portions of such bars in such a manner that rotation of such bars is translated into lateral adjustment movement of the tool.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Although the features of the present invention have been illustrated and accordingly will be described in the environment of a boring machine, that is, a device enabling the formation of holes or bores of varying depths and diameters to be provided in work pieces, the invention has broader utility and may accordingly be used in other machine equipment, such as lathes, milling machines, etc., and can be mounted for movement with respect to a stationary piece of work or for operation on moving work when in a stationary attitude or combinations of both.

Figure 1:
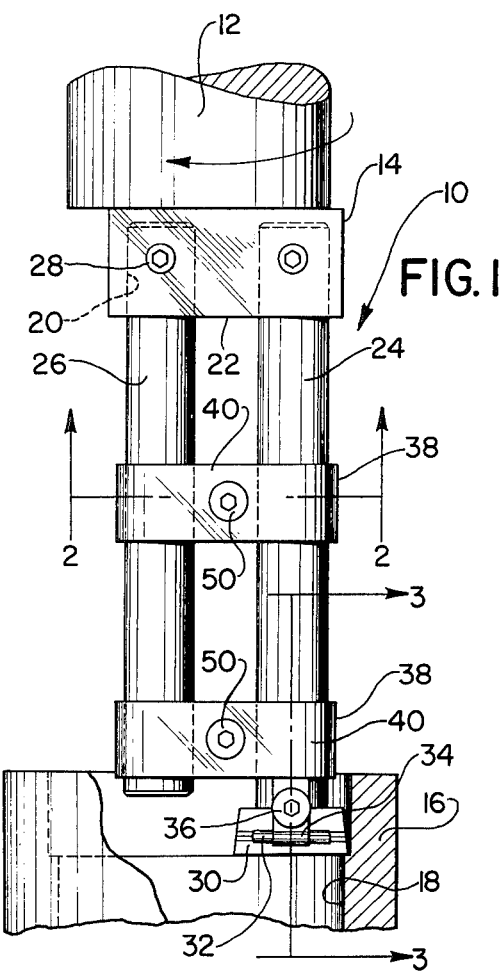
FIG. 1 is an elevational view of a tool stabilizing system mounted on the head of a boring machine and embodying features of the present invention.

Referring now to the drawing, and particularly to FIG. 1 thereof, the stabilizing device of the present invention is shown and is generally indicated at 10. The stabilizing device 10 is mounted on the revolving head or turret 12 of a conventional boring machine by a holding block 14 and is disposed in relationship to a work piece 16 such that an opening or bore 18 is formed therein by the cutting action of a tool, as will be described. The holding block 14 is secured in any known manner to the turret 12 for rotation therewith, and is provided with at least a pair of openings 20 extending through the front face 22 thereof, the openings 20 receiving one end of a work tool supporting bar 24 and a stabilizing bar 26. The positioning of the bars 24, 26 within the openings 20 is established by set screws 28. Mounted on the lowermost end of the tool bar 24 is a cutting tool 30 that is held in place by the co-action of holding pins 31 and 32 that are received in grooves formed in the inner face 33 of a nut 34. The lowermost end of the nut 34 is forced against the cutting tool 30 by a fastening screw 36, the pin 32 being urged into a double "V" groove to positively hold that tool 30 in place. It is understood that other holding means as appropriate may be utilized to secure the tool 30 in position at such end of the tool holding bar 24.

It is seen that the mechanism above-described may be utilized either solely by operation of the tool holding bar 24 in those cases where its strength and extent provides the necessary rigidity during work to produce bores of the desired tolerance, or may as contemplated herein be used in conjunction with the stabilizing bar 26. Both the bars 24 and 26 are formed of a tool steel of the like, and although are generally of cylindrical cross-sectional configuration, i.e. of rod form, each may assume any configuration so long as such does not interfere with the intended operation. In those cases where the bar 24 does not provide the necessary strength characteristics to accomplish the work within the desired tolerances or at the operational speeds desired, the rigidity of the tool holder 24 may be increased by its use in conjunction with the stabilizer bar 26. As shown in FIG. 1 the stabilizer bar 26 is located in generally parallel spaced disposition with respect to the tool holder bar 24 and may be of any convenient length, it being clear that it is not necessary for the stabilizer bar to assume the same or similar length as the tool holder bar 24.

The interconnection between the two bars 24, 26 is accomplished by one or more rigid connecting members 38 which span the distance between the bars 24 and 26, and accordingly serve to interconnect such in a more rigid attitude at one or more locations along their mutual longitudinal extent. Each of the connecting members 38 comprises a pair of preferably similar shaped bracket portions 40, which are formed with a pair of inwardly directed spaced channels 42 for cooperative receipt of such bars 24, 26. The bracket portions 40 may be adjusted laterally towards each other so as to compress or otherwise hold the connecting members 38 longitudinally with respect to the bars 24, 26, and to similarly adjust such bracket portions 40 away from each other so that the connecting members 38 may be longitudinally movable along the bars 24, 26. Such adjustment is carried out by the holding means generally indicated at 44, which includes aligned channels 46, 48 passing through both the bracket portions 40 generally centrally thereof, that is, between the channels 42. At least channel 48 has threads formed therein for threadably receiving a bolt 50 that extends therethrough, and which upon rotation serves to accomplish the above-described positioning functions. The shaft of the bolt 50 is further provided with a rubber "O" ring 52 that is compressed between the bracket portions 40 upon the assembly thereof.

Figure 3:
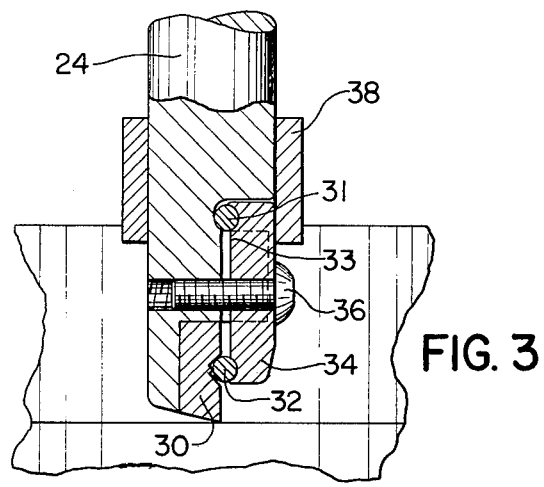
FIG. 3 is a further sectional view taken along line 3—3 in FIG. 1.
Figure 4:
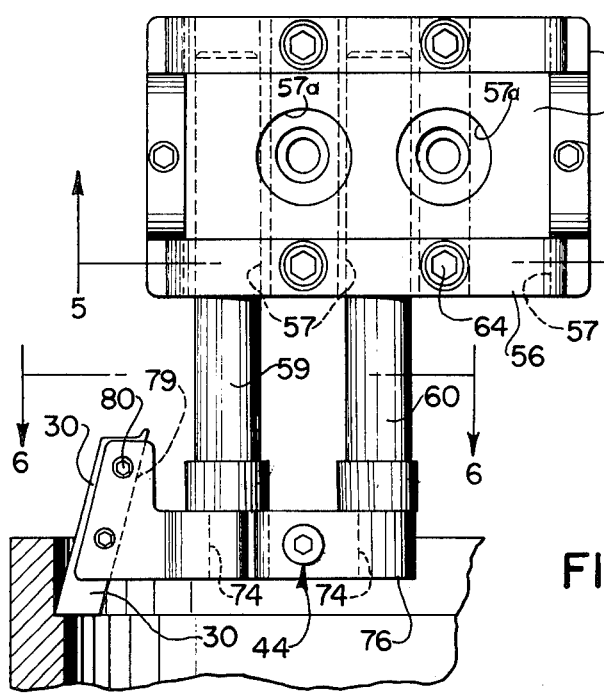
FIG. 4 is an elevational view showing a modified embodiment of the present work tool stabilizing system, and particularly showing constructional features of a holding block therefor.
Figure 5:
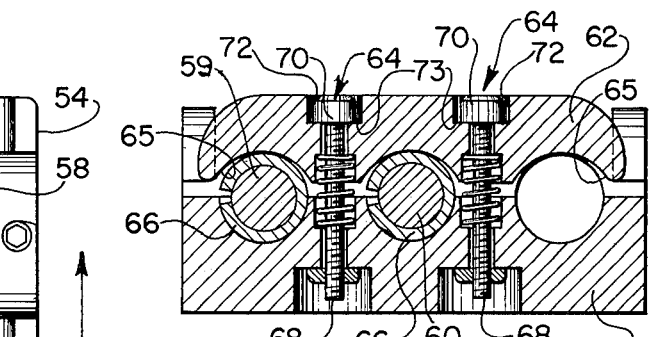
FIG. 5 is a sectional view taken along line 5—5 in FIG. 4.
Figure 6:
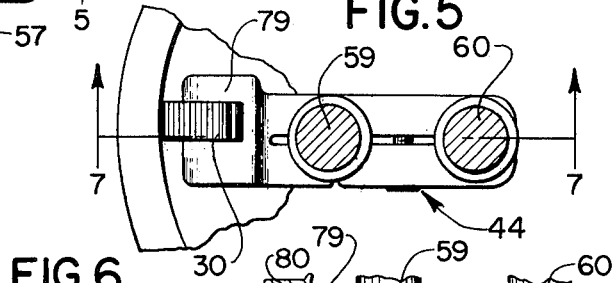
FIG. 6 is a sectional view taken along line 6—6 in FIG. 4.
Figure 7:
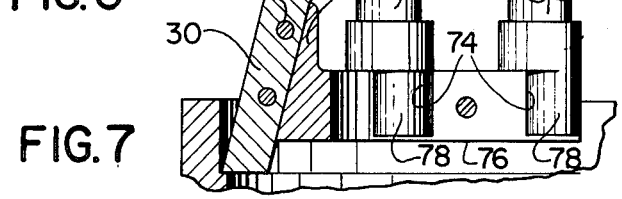
FIG. 7 is a side sectional view taken along line 7—7 in FIG. 6, and shows in particular the eccentric mounting of a modified form of tool holder.

It is also seen that upon operation of the device the stabilizer bar 26 need not project inwardly into the bore 18 being formed within the work piece 16, but may be of a shorter length, whereupon its stabilizing connection by means of the connecting members 38 would be located further from that end of the tool holding bar 24 engaged with the tool 30 as when forming a relatively long narrow opening. It should also be clear in such case that a relatively longer stabilizing bar could be utilized at the initial formation of such an opening, and thereafter the operation halted and a shorter stabilizing bar substituted so as to assure stabilization and support for the boring bar 24 without the necessity of changing it and the attendant neceissity of modifying the positioning of the tool 30 with respect to the work. Furthermore a plurality of connecting brackets 38 may be utilized as shown in FIG. 1 when necessary or desirable. Also when disposed proximate to the tool holding end of the tool holder bar 24, the lowermost of the connecting members 38 may additionally and as best depicted in FIG. 3, serve to lock the nut 34 in place by means of its internal abutment with outer portions of the nut 34.

Referring now to FIGS. 4 through 7 of the drawing, a modified form of the invention is disclosed. As shown a holding block 54 of modified construction is provided and includes a face 56 through which a plurality of parallel, longitudinally directed bores or openings 56, generally corresponding to bores 20 of the previously described holding block 14, are formed therein. At least a pair of such openings 57 are provided, and preferably three or more, so that a pair of bars 59, 60 corresponding to bars 26, 24 of the previously explained embodiment, that is, a primary toolholding bar 59 and a stabilizing bar 60, may be received therein in alternate positions so as to increase the flexibility of use of the resultant machine tool. Additionally at least another face 58 of the block 54 is provided with at least another pair of openings 57a so as to enable the block 54 to receive the bars or rods 59, 60 in yet additional spaced relationships.

The holding block 54 is similar in construction to the previously described connecting members 38 inasmuch as it includes opposed, partial bracket portionss 61, 62 that are urge in opposed relationship to each other by adjustment and clamping means generally indicated at 64. The clamping means 64 includes longitudinally oriented channel portions or pockets 65 for receiving the bars 59, 60 or a holding collar 66 disposed intermediate thereof. The clamping means 64 further includes a threaded rod 68 having a head 70 positioned within cavities 72 and adapted to be urged against shoulder portions 73 thereof, so as to alternatively urge such members 61, 62 towards and away from each other to provide for relatively quick acting release and clamping positions of the bars 59, 60.

Figure 2:
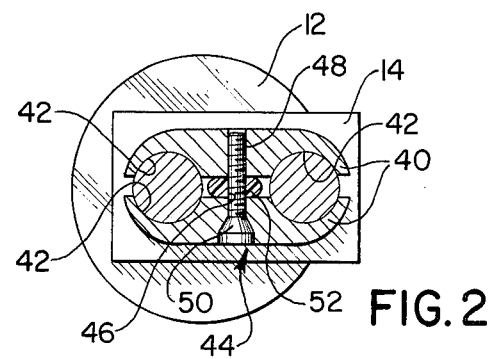
FIG. 2 is a sectional view thereof taken along line 2—2 in FIG. 1.

Additionally, the bars 59, 60 have eccentric extensions 78 formed on the ends thereof opposite to their connection with the holding block 54, the eccentric extensions 78 being adapted to interfit into cooperating openings 74 of a tool holder 76 of modified construction. The longitudinal position of the tool holder 76 with respect to the bars 59, 60 is determined by the placement of the extensions 78, which in effect provide a limiting abutment between the bars and the tool holder 76. The tool holder 76 may be similar in construction to the connecting members 38 described above, and is adapted to position a tool 30 in lateral disposition relative to the workholder bar 24 by suitable means such as the offset head 79 and the spaced set screws 80. It is seen that the tool holder 76 and accordingly the tool 30 in such embodiment is supported by the tool support bar 59, but additionally due to its preferred connection with the stabilizing bar 60, the tool support bar 59 receives additional stablizing and bracing. This is accomplished in substantially the same manner as for the rigid connecting bracket 38 described in connection with FIGS. 1-3. As further illustrated in FIG. 6, the cutting edge of the tool 30 is located in alignment with the horizontal axes of the bars 59 and 60 and as a result is also located in alignment with the horizontal axis of the work piece when the tool holder 76 is disposed coaxial with the work piece.

It should also be clear that the eccentric disposition of the tool holder end 78 with regard to main portion of the bar 59 and that of the stabilizing bar 60 when used cooperatively as depicted, enables rotational movement of the bar 59 or the simultaneous rotational movement of bars 59, 60 to be translated into lateral adjusting motion of the tool holder 76, and thus results in lateral adjustment of the tool 30 with respect to the work 16. When so positioned, the tool holder 76 may be disposed with relationship to either or both of the ends 78 as above described by utilization of the adjustment means 44 disposed laterally between the openings 74 provided therein and adapted to receive the eccentric ends 78 of the bars 59, 60.

It is accordingly believed that the above-described embodiments of the present invention accomplish the various objectives thereof in a substantially novel and unique manner which enhances the usefulness of limited tooling and machine capabilities without the necessity of an expanded inventory of various boring bars.

While there is shown and described herein certain specifice structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for stabilizing a work tool and the like comprising a first bar having means at one end thereof for supporting a tool, a second bar independent of such first bar and said tool and adapted for disposition in spaced parallel relationship to said first bar with one end thereof extending towards but spaced from said tool, connecting means including at least one rigid member adapted to span and interconnect said bars so as to stabilize movement of said tool during work, and a holding block having spaced openings for receipt of said other ends of said bars for positioning said bars with respect to each other.

2. The device set forth in claim 1, said connecting means spanning said bars intermediate the respective ends thereof.

3. The device set forth in claim 2, said connecting means comprising an opposed pair of rigid member portions, each said portions having a pair of inwardly directed spaced channels for receipt of longitudinally directed portions of said bars and means for urging said portions towards and away from each other so as to adjust the longitudinal position of said rigid member relative to said bars.

4. The device set forth in claim 3, said adjustment means positioned laterally intermediate said pair of bar receiving channels.

5. The device as set forth in claim 2, there being more than one of said rigid connecting members.

6. The device as set forth in claim 1, said rigid connecting member spanning said bars at said one ends thereof, said member in turn having means for supporting a tool laterally offset from bars, and means operatively associated with said member for varying the lateral disposition of said tool with respect to said bars.

7. The device as set forth in claim 6, said one ends of said bars being eccentric from remaining portions of said bars, whereby rotation of said remaining portions thereof laterally moves said rigid member with respect to both of said bars, anc accordingly laterally adjusts the position of said tool positioned in said rigid member with respect to said bars.

8. The device as set forth in claim 7, said rigid connecting member having a pair of spaced longitudinally oriented openings for receipt of said eccentric bar ends, and means disposed laterally between said openings for positioning said member on said eccentric bar ends.

9. The device as set forth in claim 1, including means for mounting said block with respect to the work so as to provide for controlled relative movement therebetween.

* * * * *